(12) United States Patent
Sanghavi

(10) Patent No.: US 10,374,988 B2
(45) Date of Patent: Aug. 6, 2019

(54) ACTIVITY BEACON

(71) Applicant: Apple Inc., Cupertino, CA (US)

(72) Inventor: Mehul K. Sanghavi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 14/697,134

(22) Filed: Apr. 27, 2015

(65) Prior Publication Data

US 2016/0315885 A1  Oct. 27, 2016

(51) Int. Cl.
*G06F 15/16* (2006.01)
*H04L 12/58* (2006.01)

(52) U.S. Cl.
CPC .......... *H04L 51/046* (2013.01); *H04L 51/36* (2013.01)

(58) Field of Classification Search
CPC .............................. H04L 51/046; H04L 51/36
USPC ........................................................ 709/206
See application file for complete search history.

(56) References Cited

U.S. PATENT DOCUMENTS

| | | | |
|---|---|---|---|
| 7,496,623 B2 * | 2/2009 | Szeto .................. | G06Q 10/107 709/203 |
| 7,664,816 B2 | 2/2010 | Heron et al. | |
| 8,037,139 B1 | 10/2011 | Fish et al. | |
| 8,219,703 B2 * | 7/2012 | Sparre .................. | G06Q 20/102 358/1.15 |
| 8,346,284 B2 | 1/2013 | Khokhlov | |
| 8,812,600 B1 | 8/2014 | McGuirk et al. | |
| 2014/0067946 A1 * | 3/2014 | Bruich ................ | H04L 65/4084 709/204 |
| 2014/0250433 A1 * | 9/2014 | Stekkelpak ......... | G06F 9/44505 717/176 |
| 2015/0350145 A1 * | 12/2015 | Sanghavi ............. | H04L 51/24 709/206 |

\* cited by examiner

*Primary Examiner* — Atta Khan
(74) *Attorney, Agent, or Firm* — Blank Rome LLP

(57) ABSTRACT

Systems, methods, and computer-readable storage media for sharing activity data through activity beacons. The system first receives a signal to enable a service for sharing activity data between the first device and a second device during a communication session between the first device and the second device, wherein the communication session is maintained via a first application. The system then tracks an activity associated with at least one of the first device or a second software application at the first device to yield activity data. Next, the system transmits an activity beacon from the first device to the second device, the activity beacon including the activity data and a second signal for triggering a presentation of a representation of the activity at the second device within the first application.

18 Claims, 15 Drawing Sheets

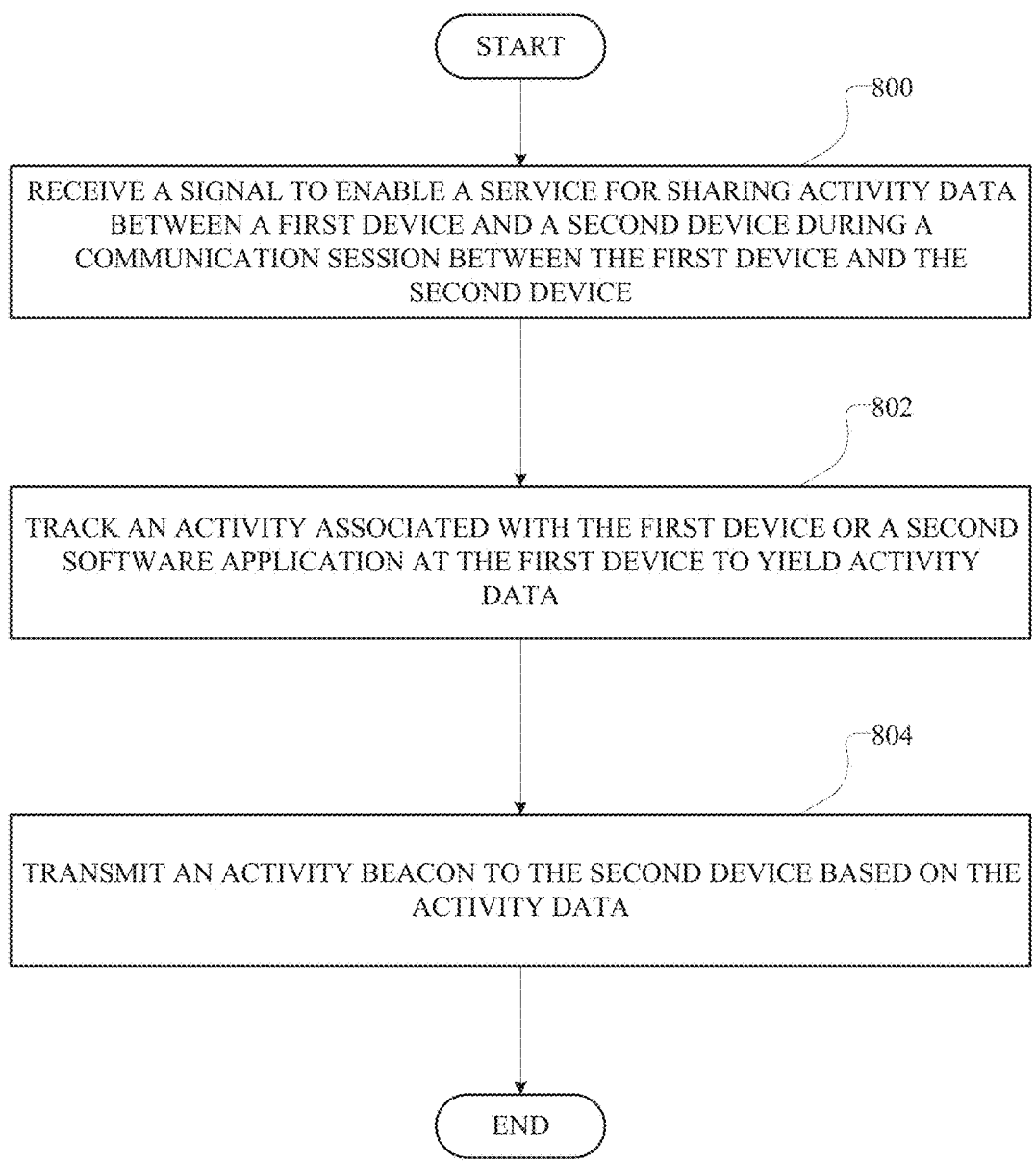

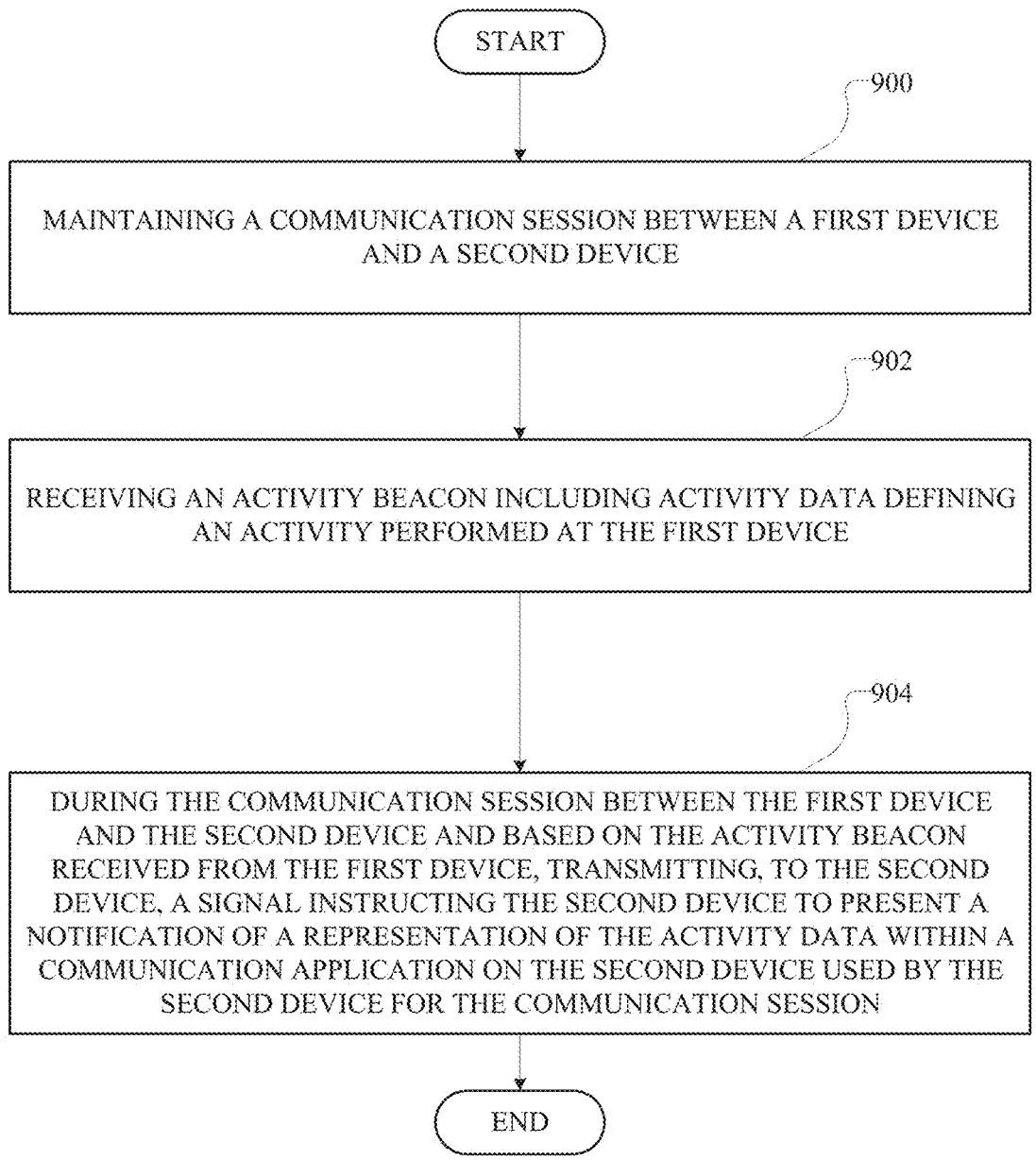

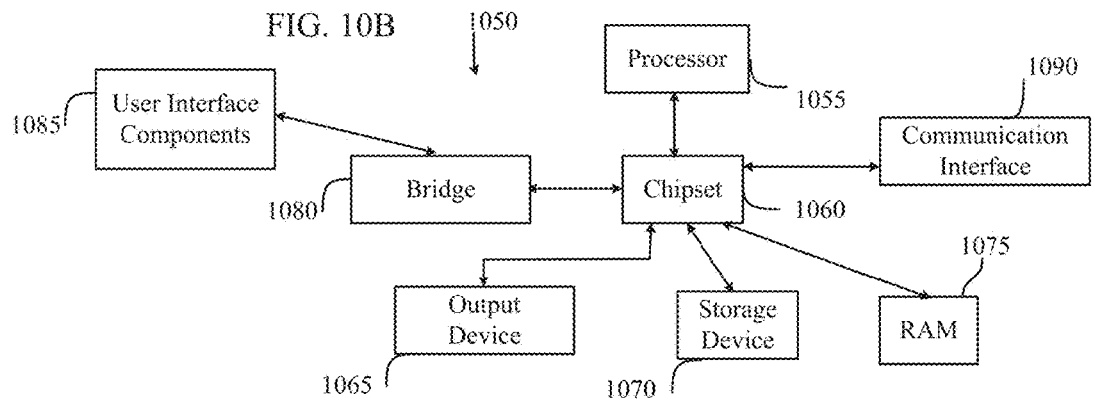
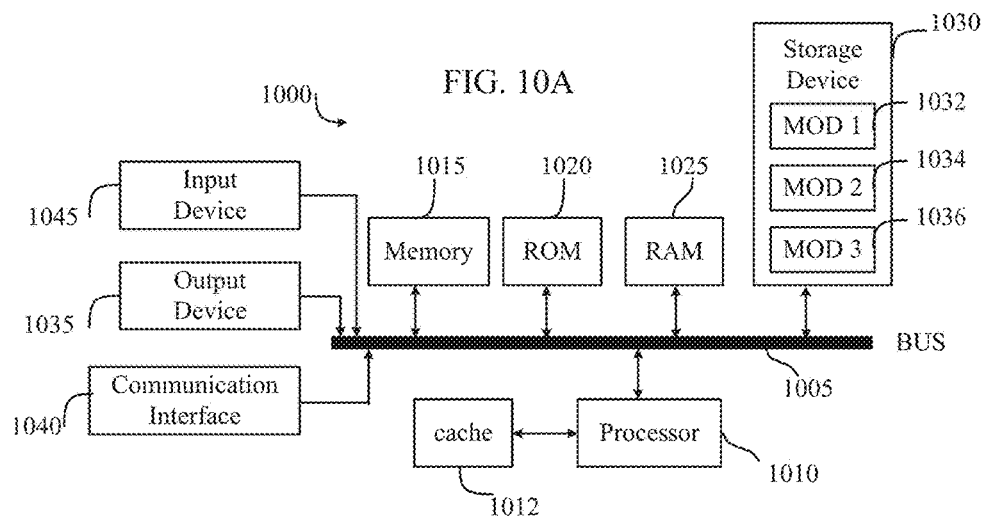

ACTIVITY BEACON

TECHNICAL FIELD

The present technology pertains to sharing activity data, and more specifically pertains to sharing activity data between devices using activity beacons.

BACKGROUND

Various types of software applications allow users to communicate using text, video, audio, and multimedia. For example, users can send text messages from separate devices using a specific text messaging application. Users can also send messages from separate devices using an instant messaging application, which allows the users to maintain an instant messaging communication session. Unfortunately, the information shared between users during a communication session is limited to the data entered by the users at their respective communication applications (e.g., text messaging applications, instant messaging applications, etc.). Disadvantageously, current solutions do not allow users to share other types of data from their respective devices during a communication session, such as real-time activity data. Yet such additional type of data can greatly enrich the user's communication and computing experience.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for sharing real-time activity data between devices using activity beacons. The system first receives a signal to enable a service for sharing activity data between the system and a separate device during a communication session between the system and the separate device. The communication session between system and separate device can be maintained through a first application. The first application can be, for example, an instant messaging application, an email application, a text messaging application, a video conference application, an asynchronous messaging application, an audio communication application, iMessage®, or any other communication application. The signal to enable the service can be a setting for an Activity Beacon service. The setting can be configured from a specific application or a system device settings or preferences panel, for example.

The system then tracks an activity associated with the system and/or a second software application at the system to yield activity data. Here, the activity can be a usage or status of the system or the second software application. For example, the activity can be usage of specific features of the system or a launch of the second software application. The activity data can include time-based metadata associated with the activity, system data, user preferences, interactions, and/or a current user status. The user preferences can indicate, for example, do not disturb, try again later, user is busy or driving, etc. The current user status can include, for example, an indication that a user associated with the system is currently performing a user activity or an indication that the user is currently in a no-connectivity zone.

Moreover, the second software application can be different or separate from the first application (i.e., the communication application). For example, the first application can be a messaging application and the second application can be a specific software game. In some cases, the second application can refer to a system preference or feature. For example, the second application can refer to a do not disturb feature enabled for a specific type of communication at the system.

Next, the system transmits an activity beacon to the separate device. The activity beacon can include the activity data and a second signal for triggering a presentation of a representation of the activity at the separate device within the first application. The activity data can be included in a payload of the activity beacon. Moreover, the representation of the activity can be an icon, a logo, an image, a video, a text, a graphical element, a symbol, a character, or any other representation. Further, the representation of the activity can be a notification of the activity. The notification can provide an indication of the activity executed at system using the representation of the activity.

The notification can be user-selectable such that a user selection of the notification can trigger a prompt associated with the activity. The prompt can be a request to perform the activity, launch or install an application associated with the activity (e.g., the second application), save or access content, etc. Thus, a user at the separate device can receive the notification indicating the activity at the system, and select—or click on—the notification to trigger a prompt which subsequently can allow the user to join in the activity.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 8 and 9 illustrate example method embodiments; and

FIGS. 10A and 10B illustrate example system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Disclosed are systems, methods, and non-transitory computer-readable storage media for sharing real-time activity data between devices using activity beacons. A brief introductory description of an example communication session for sharing activity data is first disclosed herein. A detailed description of sharing activity data using activity beacons, including examples and variations, will then follow. These variations shall be described herein as the various embodiments are set forth. The disclosure now turns to FIG. 1.

Figure 1:
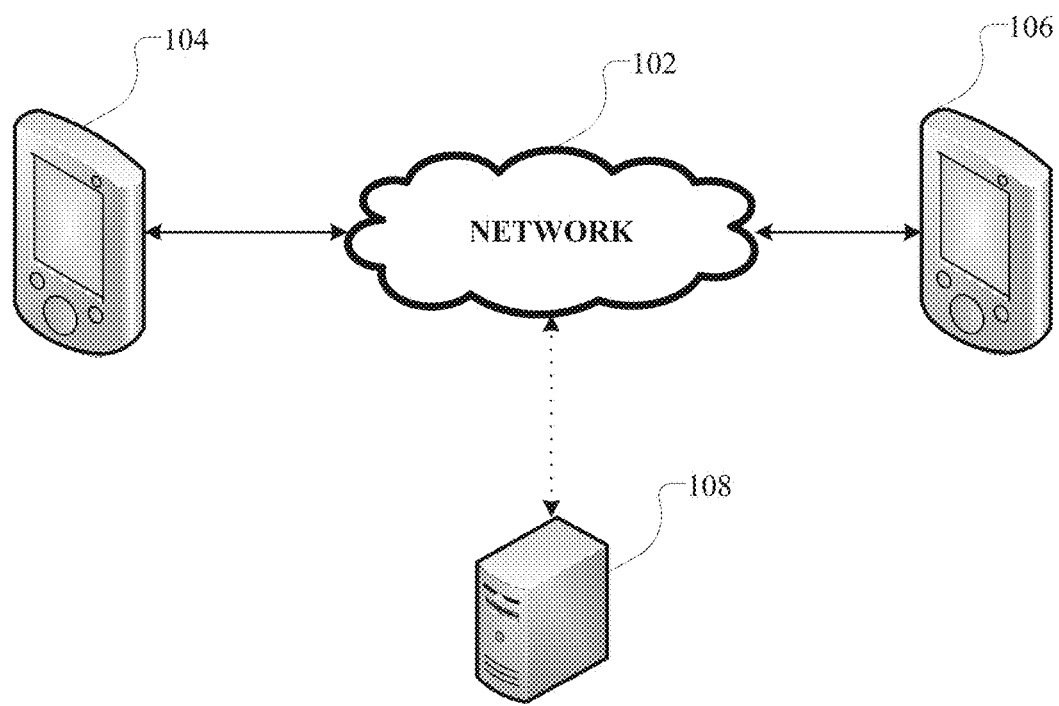
FIG. 1 illustrates an example communication session for sharing activity data.

FIG. 1 illustrates an example communication session 100 between devices in a network for sharing activity data. The network 102 can be used by device 104, device 106, and server 108 to communicate with each other. In particular, device 104 and device 106 can establish and maintain a communication session and share data, including activity data, through network 102. In some cases, device 104 and device 106 can use server 108 to facilitate the communication session, as well as the sharing of data. For example, server 108 can maintain, manage, and/or control the communication session between device 104 and device 106. Server 108 can also store and share data with device 104 and device 106, such as activity data, state, documents, applications, or preferences. Moreover, server 108 can manage certain operations and perform various services for device 104 and device 106, such as filtering operations, notifications, recommendations, alerts, manage requests, process data, etc.

Network 102 can include a private network, such as a local area network (LAN); a public network, such as the Internet; or any combination of private and public networks. Moreover, devices 104-106 can include, for example, a mobile device, a tablet computer, a laptop computer, a desktop computer, a smartphone, a gaming system, a smart television, or any device with networking capabilities. Server 108 can include a server, a cluster of servers, a cloud, a database, or any combination of devices.

As previously mentioned, device 104 and device 106 can establish a communication session with each other, as well as any additional devices, through network 102. The communication session can also be established, managed, controlled, processed, and/or facilitated by server 108. Further, the communication session can include, for example, a telephone call; a video session; an email communication; an instant messaging session; a text messaging session, including any type of messaging such as short message service (SMS), multimedia messaging service (MMS), smart messaging, extended message service (EMS), etc.; iMessage®; and so forth.

Devices 104-106 can include one or more software applications for conducting the communication session and sharing data with each other. For example, devices 104-106 can include a text messaging application, an email application, a video conferencing application, an application for making and handling telephone calls, an instant messaging application, and so forth. Devices 104-106 can also include additional applications, such as productivity applications, gaming applications, business applications, web-based applications, browsers, file-sharing applications, tools, and so forth.

In addition, devices 104-106 can include a settings or preferences application, a control panel, a settings panel, a registry, a preference list or file, or any other file or tool for managing device and applications settings and preferences. Here, devices 104-106 can define specific settings for enabling or disabling the sharing of activity information—as well as any other related information—referred to herein as an Activity Beacon setting. The Activity Beacon setting allows a device, such as device 104, to track application or device usage and activity, and share such information with another device, as will be further explained below in FIGS. 2-7.

While devices 104-106 are shown communicating via network 102, one of ordinary skill in the art will readily recognize that, in other embodiments, devices 104-106 may communicate in other ways, such as through direct communications. For example, devices 104-106 may communicate directly using wireless; Bluetooth®; Wi-Fi Direct®; near field communications (NFC); direct physical communications, such as through a cable and/or a switch; or any other direct communications. However, devices 104-106 are shown in FIG. 1 communicating through network 102 for clarity and explanation purposes.

Figure 2:
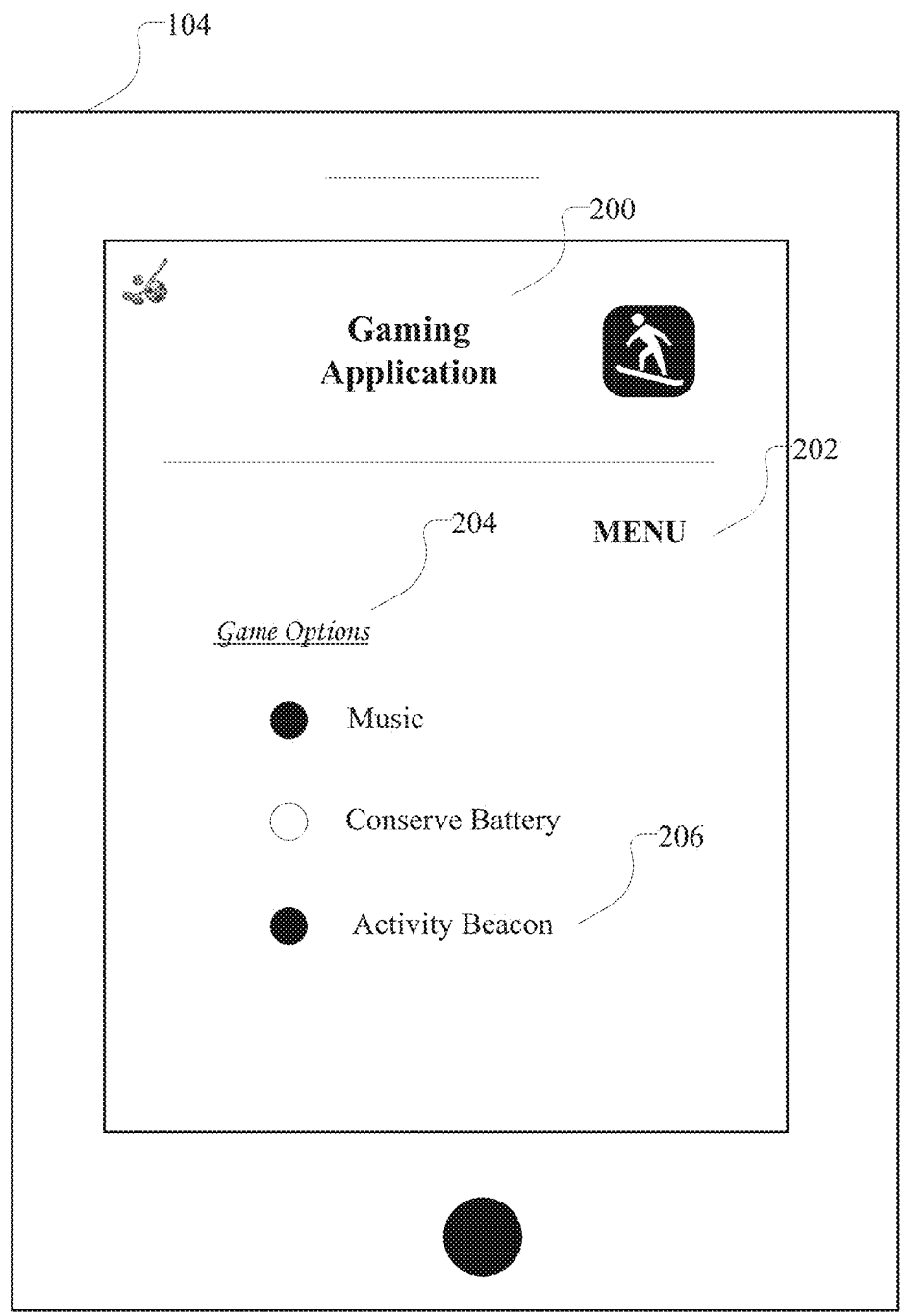
FIG. 2 illustrates an example configuration for sharing device usage and activity through an Activity Beacon setting.

The disclosure now turns to FIG. 2, which illustrates an example configuration for sharing device usage and activity through an Activity Beacon setting. On device 104, the user can open a particular application 200, such as a gaming application, a reading application, a productivity application, an article, a web page, a browser, or any type of application. For the sake of clarity and explanation purposes, in FIG. 2, the application 200 is a gaming application. From the gaming application 200, the user can go to a menu page 202, which can be the page for configuring the settings, options, or preferences for the gaming application 200. The menu page 202 can include a game options 204 menu, where the user can configure the particular settings or preferences for the gaming application 200. Within the game options 204, an Activity Beacon setting 206 can be turned on or off to enable or disable the sharing—including sending and receiving—of usage and activity information for the gaming application 200 with other devices, such as device 106.

When turned on, the Activity Beacon setting 206 can run an Activity Beacon service (not shown) on the device 104 to track, monitor, and collect usage and activity data from the gaming application 200. Thus, when the user runs or executes the gaming application 200, the Activity Beacon service, enabled through the Activity Beacon setting 206, can detect that the gaming application 200 is in use. The Activity Beacon service can then transmit Activity Beacon data to device 106 when device 104 and device 106 are engaged in a communication session, such as a text messaging session, an instant messaging session, a video session, a chat, a telephone call, an email session, or any other communication session. The usage and activity of the gaming application 200 on device 104, as collected and transmitted by the Activity Beacon, can then be presented on device 106 during the communication session. Such usage and activity can be presented within an application used at device 106 to communicate with device 104 in the communication session, as will be further explained in FIGS. 3-8 below.

The Activity Beacon setting 206 can be turned off by the user or device 104 at any particular time based on a user input, a schedule, a preference, a system condition, a trigger, an event, or any other condition or activity. Moreover, as will be further explained, the Activity Beacon setting 206 can be implemented for other applications, activities, conditions, or device settings and events. For example, the Activity Beacon setting 206 can be provided for other applications on the device 104 to share application usage and activity data for each particular application with the Activity Beacon service enabled. The Activity Beacon setting 206 can also be provided for system activities or settings. For example, do not disturb system settings for certain types of communications can have an Activity Beacon setting which users can enable to share the do not disturb settings with other users and devices.

The Activity Beacon setting 206 can be a setting that is specific to the gaming application 200. However, in some cases, device 104 can include a global Activity Beacon setting for enabling or disabling the sharing of activity and/or data. Such global setting can turn on the sharing of activity information for all pertinent applications or turn off the sharing of activity information for all applications. In some cases, device 104 can include a global Activity Beacon setting as well as an application-specific Activity Beacon setting. Here, the global setting can provide a general enable or disable status, while the application-specific Activity Beacon setting can provide more detailed or granular preferences for sharing activity information. Indeed, the global setting may allow the sharing to be turned on or off for all applications, and the application-specific setting can be used to individually change the global setting for a specific application.

The status of the Activity Beacon setting can be maintained by server 108. Server 108 can also collect and track activity information from one device to be shared to another device. Moreover, server 108 can send the activity data shared by one device to another device, as well as any additional information, such as recommendations or alerts. Server 108 can also facilitate the download, purchase, or access of documents, applications, or data related to activity data shared or received by a device. For example, if device 104 shares a usage of Application B with device 106, server 108 can send the activity information from device 104 to device 106, and help device 106 obtain Application B if it is not already installed on device 106 and/or if the user at device 106 has requested access to Application B.

In some cases, server 108 can monitor activity, statistics, preferences, and Activity Beacon data, to manage what type or specific activity data a device should receive. For example, server 108 can determine that device 106 frequently runs gaming applications and make a determination that device 106 should receive activity data related to gaming applications. On the other hand, if server 108 determines that device 106 does not use, share, or have gaming applications, server 108 may determine that device 106 is not interested in activity data related to gaming applications and may as such filter such type of activity data. In other cases, server 108 can actively request specific types of activity data to be received by a device based on monitored activity, statistics, preferences, etc. In some embodiments, each device individually can make the determinations of what activity data and type of activities should be received and/or shared. For example, device 106 may filter gaming activity data based on a determination by device 106 that device 106 does not have any gaming applications and/or does not frequently use, within a threshold, gaming applications.

FIGS. 3A-D illustrate an example mechanism for sharing, within a messaging application, Activity Beacon data related to a gaming application. The Activity Beacon data can be shared between device 104 and 106 either directly or indirectly. For example, device 104 can share the Activity Beacon data directly with device 106. Alternatively, server 108 may collect the Activity Beacon data from device 104 and share it with device 106. In some cases, server 108 can also filter data or supplement data shared between device 104 and device 106. For example, server 108 may filter portions of activity data shared between device 104 and device 106, or include recommendations or provide applications in addition to the activity data. In some cases, server 108 may also manage or facilitate a communication session between device 104 and device 106 established through the messaging application between device 104 and device 106.

Figure 3A:
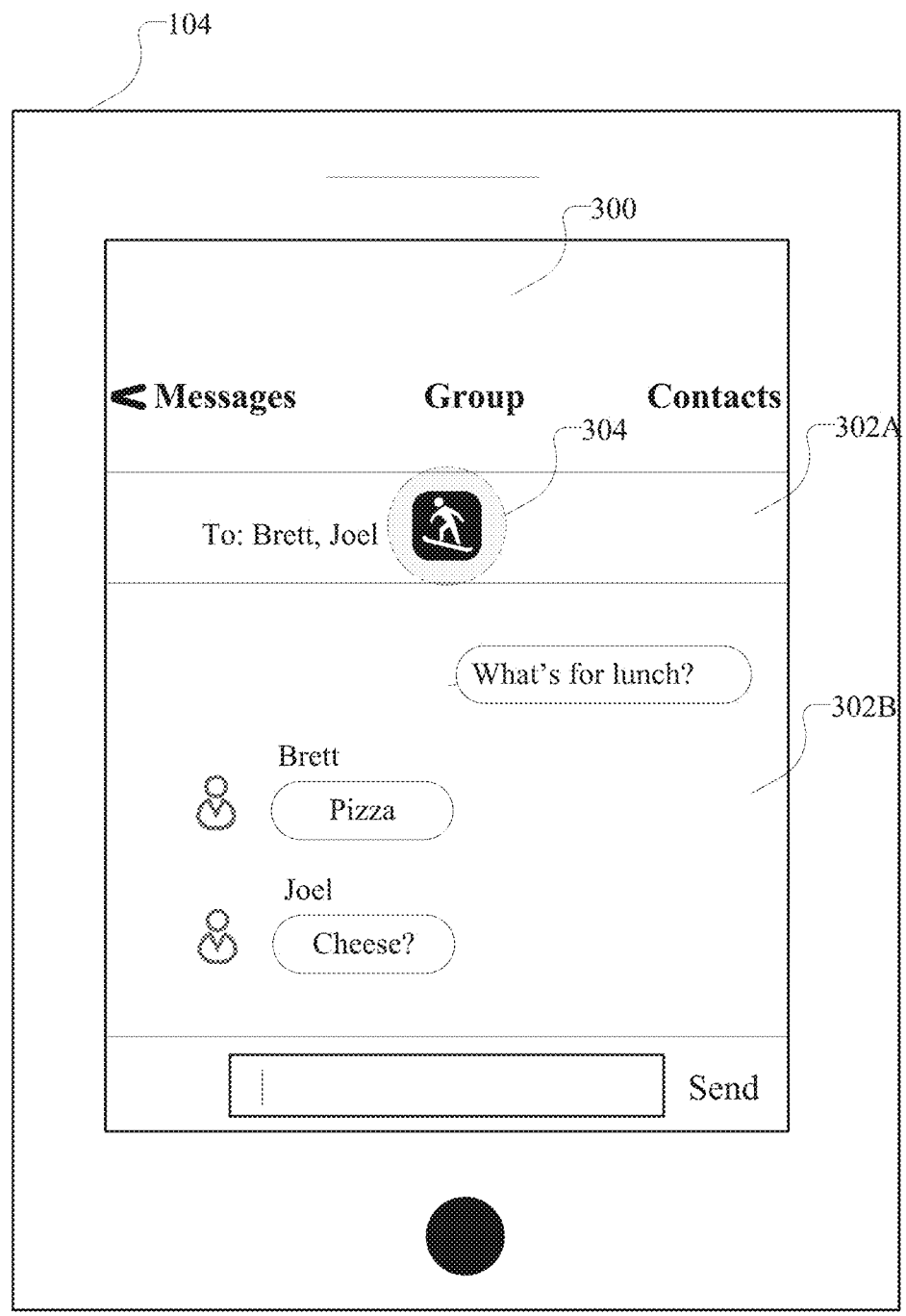
FIGS. 3A-D illustrate an example mechanism for sharing, within a messaging application, Activity Beacon data related to a gaming application.
Figure 3B:
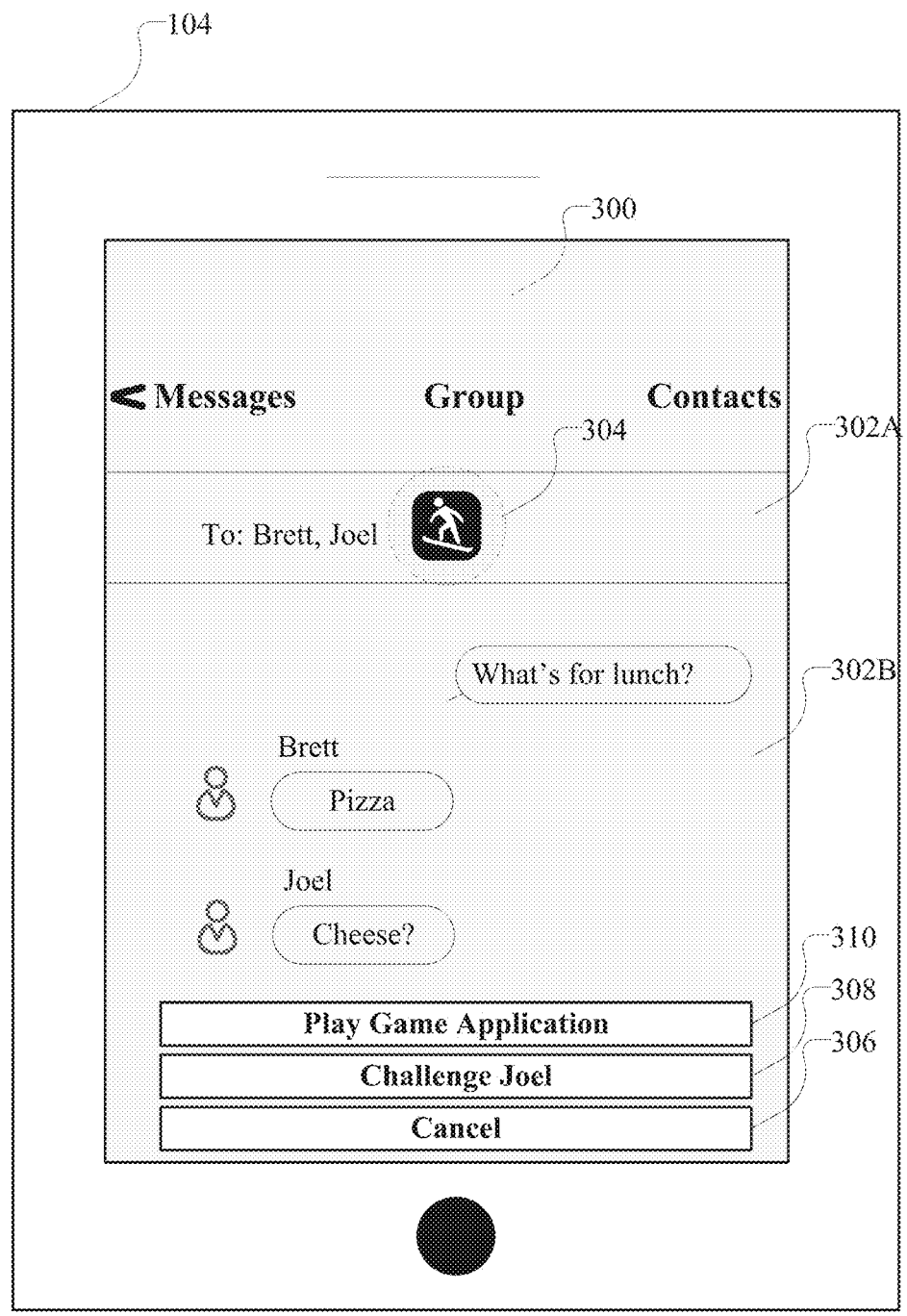

Referring to FIG. 3A, after the Activity Beacon setting 206 is enabled for the gaming application 200, device 104 can share usage and activity associated with the gaming application 200 through a messaging application 300 used by device 104 to send and receive text messages with device 106. The messaging application 300 can include a header area 302A which displays the names, numbers, or identifications of the users involved in the text messaging session. For example, header area 302A can display Brett and Joel to indicate that messaging application 300 has established a text messaging session with Brett and Joel. Messaging application 300 can also include a body area 302B which can display the messages sent and received during the communication session.

The header area 302A can also include a notification 304 indicating that a particular user is currently using the gaming application 200. Thus, the user at device 104 can look at the header area 302A of the messaging application 300 to determine that a particular user is using the gaming application 200. The notification 304 can include specific text, characters, or information to indicate which user identified in the header area 302A is associated with the notification 304 (i.e., which user is using the gaming application 200). The notification 304 can be generated by device 104 based on Activity Beacon data received from device 106, either directly or through server 108. Alternatively, the notification 304 can be generated by server 108 based on Activity Beacon data from device 106 and transmitted to device 104 for presentation at device 104.

In some cases, the notification 304 can be placed next to the name (or any other identifier used) of a user in the header area 302A to indicate that the notification 304 is associated with that specific user. For example, the notification 304 is illustrated next to Joel's name in header area 302. This can indicate that the notification 304 is associated with Joel; meaning, Joel is using the gaming application 200. If, alternatively, the notification 304 is associated with Brett, it can accordingly be presented next to Brett's name. While the notification 304 is illustrated within the header area 302A, this is done for clarity and explanation purposes, as other locations for the notification 304 are contemplated herein. For example, the notification 304 can be presented in any area within the display of device 104, including the body area 302B, for example. To illustrate, the notification 304 can be presented next to Joel's name or message within the body area 302B of the messaging application 300.

The notification 304 can be any graphical element provided to indicate usage of gaming application 200. For example, in some embodiments, the notification 304 can be an icon or image, such as the logo of the gaming application 200. In other embodiments, the notification 304 can take a different form, such as text, video, symbols, numbers, or any character or element identifying the gaming application 200. In still other embodiments, the notification 304 can include a combination of icons, images, text, symbols, numbers, video, or any other character or element.

As previously noted, the notification 304 is presented on the device 104 when the Activity Beacon service on device 106 detects usage or activity of the gaming application 200 at device 106. Thus, the Activity Beacon setting 206 for gaming application 200 is enabled or turned on at device 106, which prompts the Activity Beacon service to then share the usage or activity of the gaming application 200 at device 106 with device 104. Device 104 then presents the received usage or activity data in the messaging application 300.

The notification 304 can be user-selectable to allow the user to interact with the notification 304 and/or the gaming application 200. For example, the user can select or click on the notification 304 to launch the gaming application 200 at device 104, or initiate a prompt at device 104 with options or actions related to the gaming application 200. For example, referring to FIG. 3B, the user can select the notification 304 to receive prompts 306-310. If device 104 has the gaming application 200 installed on the device 104, the prompts 306-310 can allow the user to perform actions or initiate activities with the gaming application 200. For example, Prompt 308 can allow the user to challenge Joel to play Joel through the gaming application 200 from device 104. Thus, the users at devices 104-106 can engage in a game of the gaming application 200 from their respective devices 104-106. Moreover, prompt 310 can allow the user to launch the gaming application 200 to play the game application 200 from the device 104. On the other hand, prompt 306 can allow the user to cancel and make the prompts 306-310 disappear.

Prompts 308 and 310 can thus allow the user at device 104 to launch the gaming application 200 right from the messaging application 300 at device 104. The user at device 104 can see, right from within the messaging application 300, that the user at device 106 is playing the gaming application 200, and subsequently launch the gaming application 200 at device 104 right from the messaging application 300 in order to initiate a game of the gaming application 200 or challenge the user at device 106, for example.

As previously indicated, prompts 306-310 can be generated or presented by device 104 based on a user selection of notification 304 at device 104. In some cases, prompts 306-310 can be generated or presented by device 104 based on a signal or instruction received from server 108 in response to a user selection of notification 304. In other cases, prompts 306-310 can be generated or presented by device 104 based on a trigger detected by device 104 or server 108. For example, prompts 306-310 can be generated based on the Activity Beacon data from device 106 and a determination by device 104 or server 108 that the gaming application 200 is available at device 104.

Figure 3C:
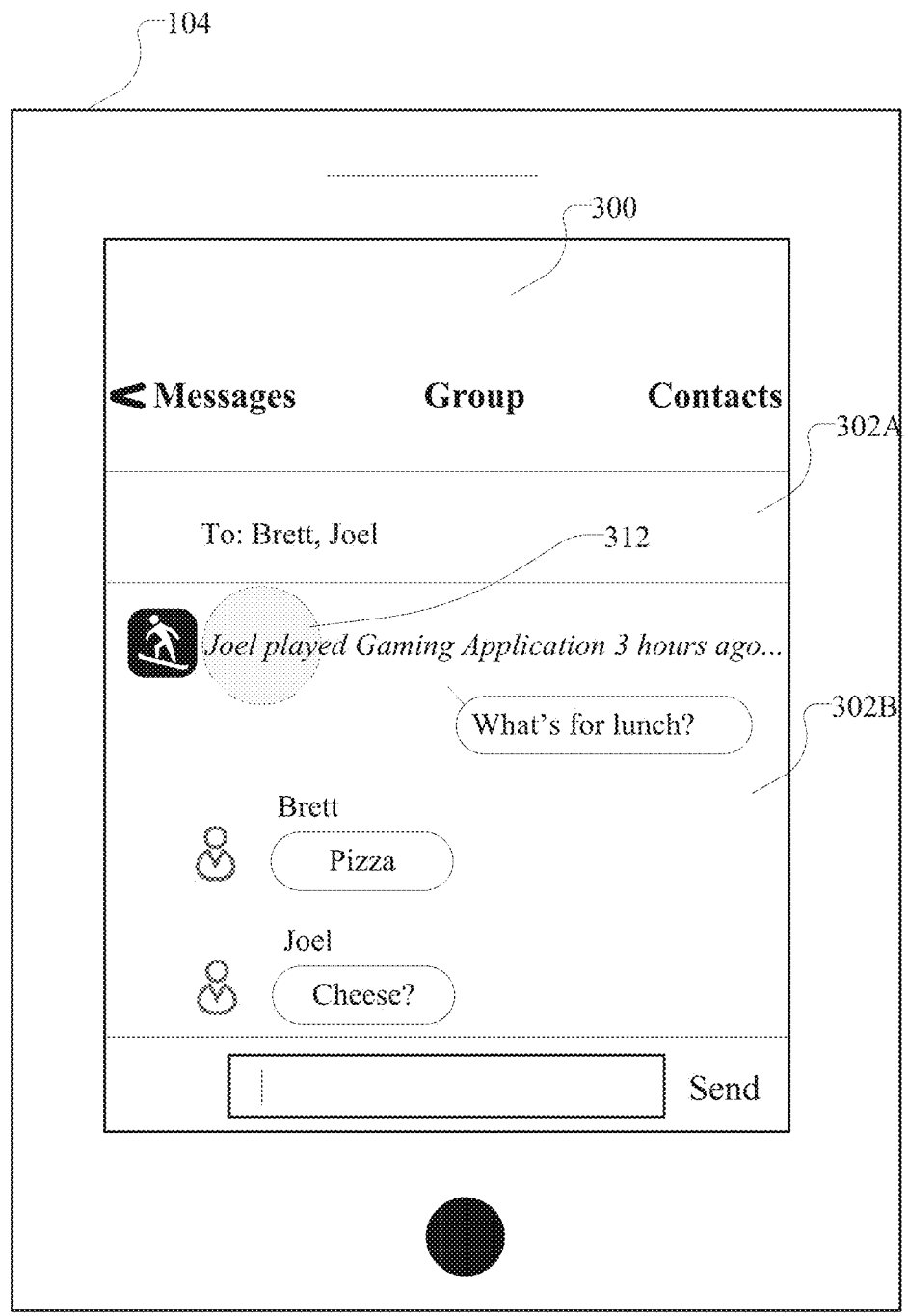

Referring to FIG. 3C, the messaging application 300 can also present an activity notification 312. In some embodiments, the messaging application 300 can present an activity notification 312 indicating that a particular user played the gaming application 200 sometime in the past. For example, the activity notification 312 can indicate "Joel played Gaming Application 3 hours ago." The activity notification 312 can also present or provide other details or information. For example, the activity notification 312 can provide statistics, such as points earned or level reached; start time; end time; an identification of other users involved in the game; etc. In some cases, the activity notification 312 can also be dynamic and/or in real-time (or near real-time). For example, the activity notification 312 can specify current activity as it happens. To illustrate, the activity notification 312 can obtain statistics of the activity at device 106 and present such statistics as they are collected. For example, if the user at device 106 (e.g., Joel) is playing a football game, the activity notification 312 can provide a notification of the score and/or each scoring event.

The activity notification 312 can be displayed in any area within the messaging application 300. For example, the activity notification 312 can be displayed within the header area 302A and/or the body area 302B. In some cases, the messaging application 300 can also provide multiple activity notifications. For example, if both Brett and Joel are playing or have played the gaming application 200, the messaging application 300 can provide an activity notification 312 for both Brett and Joel's activity.

Moreover, the activity notification 312 can be generated by device 104 or server 108. In some cases, activity notification 312 is generated by device 104 based on a signal from server 108 or device 106. The signal can include, for example, usage or activity statistics which can be received by device 104 from device 106 or server 108. In some cases, the device 104 or server 108 can make a determination of whether the activity notification 312 should be presented based on one or more factors, such as timeframe, type of activity, user preferences, current context, past activity, etc. For example, an algorithm can perform an aging calculation of activity notification data to determine whether past activity statistics should be presented on the device. Here, the algorithm can include an aging factor with a cutoff for presenting past activity.

The cutoff can also be variable or dynamic, and may depend on additional factors, such as user preferences, user activity, usage statistics, current context, type of activity, etc. For example, the aging determined for activity relating for gaming applications can be set different than the aging for activity relating to productivity applications based on the number of gaming applications installed and/or used at the device versus the number of productivity applications installed and/or used at the device, past usage of gaming applications versus past usage of productivity applications. The type of application or activity may also affect the relevance of past activity so as to impact the aging determination. For example, an article can be relevant hours or days in the future where, on the other hand, a current game may not be as relevant after the user has stopped playing it.

Figure 3D:
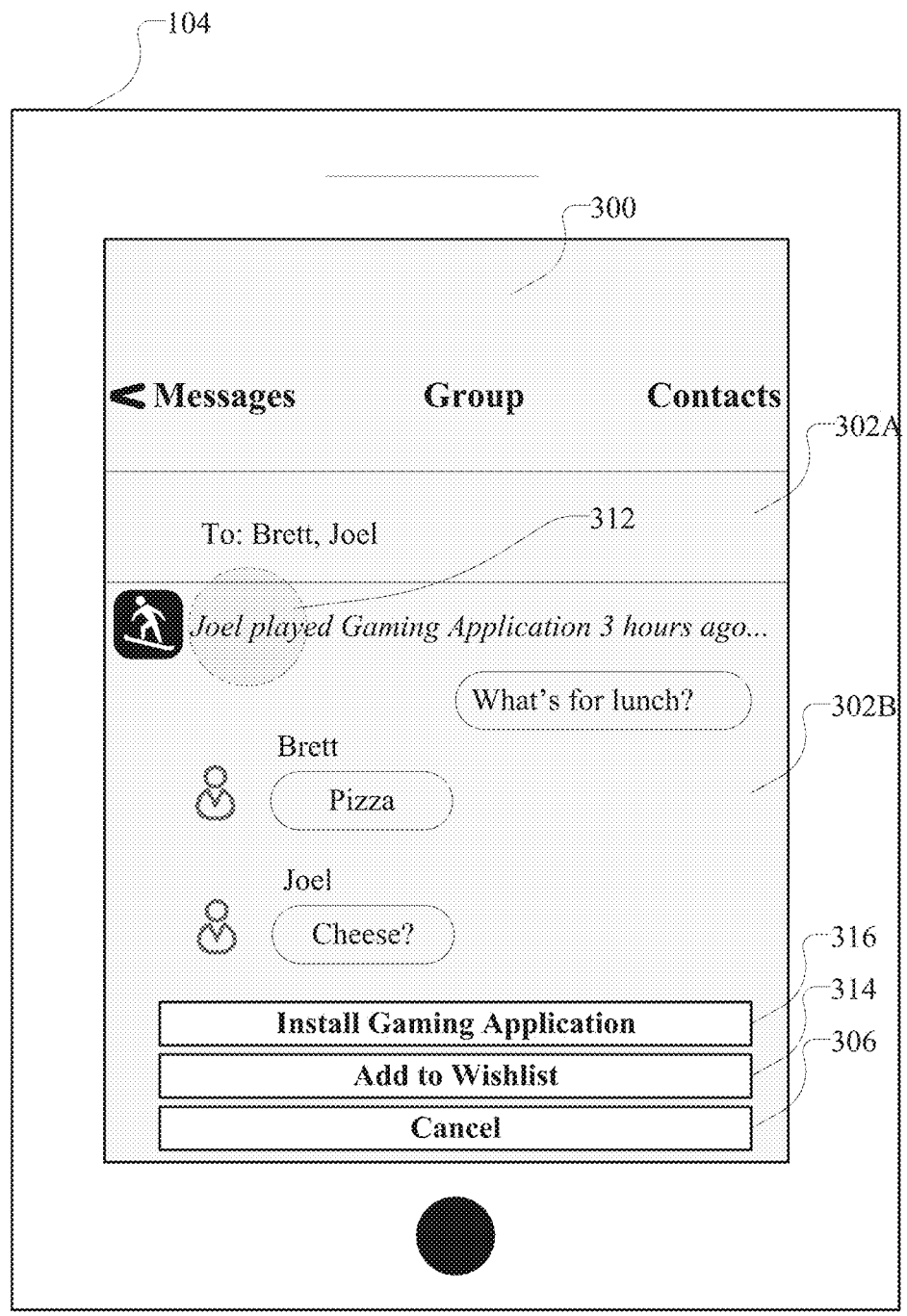

Referring to FIG. 3D, if the gaming application 200 is not installed on the device 104, the prompts 306 and 314-316 can be presented at the device 104 in response to a selection or click of the notification 304 and/or 312. Prompt 314 can allow the user at device 104 to add the gaming application 200 to a wishlist. This way, the user can later install the gaming application 200 on device 104. On the other hand, prompt 316 can allow the user to install (or initiate an install) the gaming application 200 on device 104 right from the messaging application 300. Once the gaming application 200 is installed on device 104, the user at device 104 can play the user at device 106 on the gaming application 200. The user can also receive prompts 308-310 within the messaging application 300 instead of prompts 314-316.
[TIMING FOR SHARING LIKE AGING]

While prompts 306-310 and 314-316 provide specific examples of actions which can be performed from within the messaging application 300, such examples are non-limiting examples provided for clarification and explanation. In fact, other prompts are also contemplated herein. For example, other prompts can include a prompt to remove the gaming application 200 from device 104, a prompt to perform an install of additional materials or content for gaming application 200, a prompt to send device 106 a message or data to be received at the gaming application 200 at device 106, a prompt to share the activity or gaming application 200 with other users, etc.

As previously indicated, device 104 can interact with server 108 to generate or present any of the prompts on device 104. For example, a prompt to install an application can be presented by device 104 based on a signal from server 108 indicating that the application is available for download. Server 108 can also manage or facilitate the actions triggered when a prompt is selected. For example, if device 104 detects that a prompt to install an application has been selected, the server 108 can interact with device 104 to facilitate the installation of the application.

Figure 4:
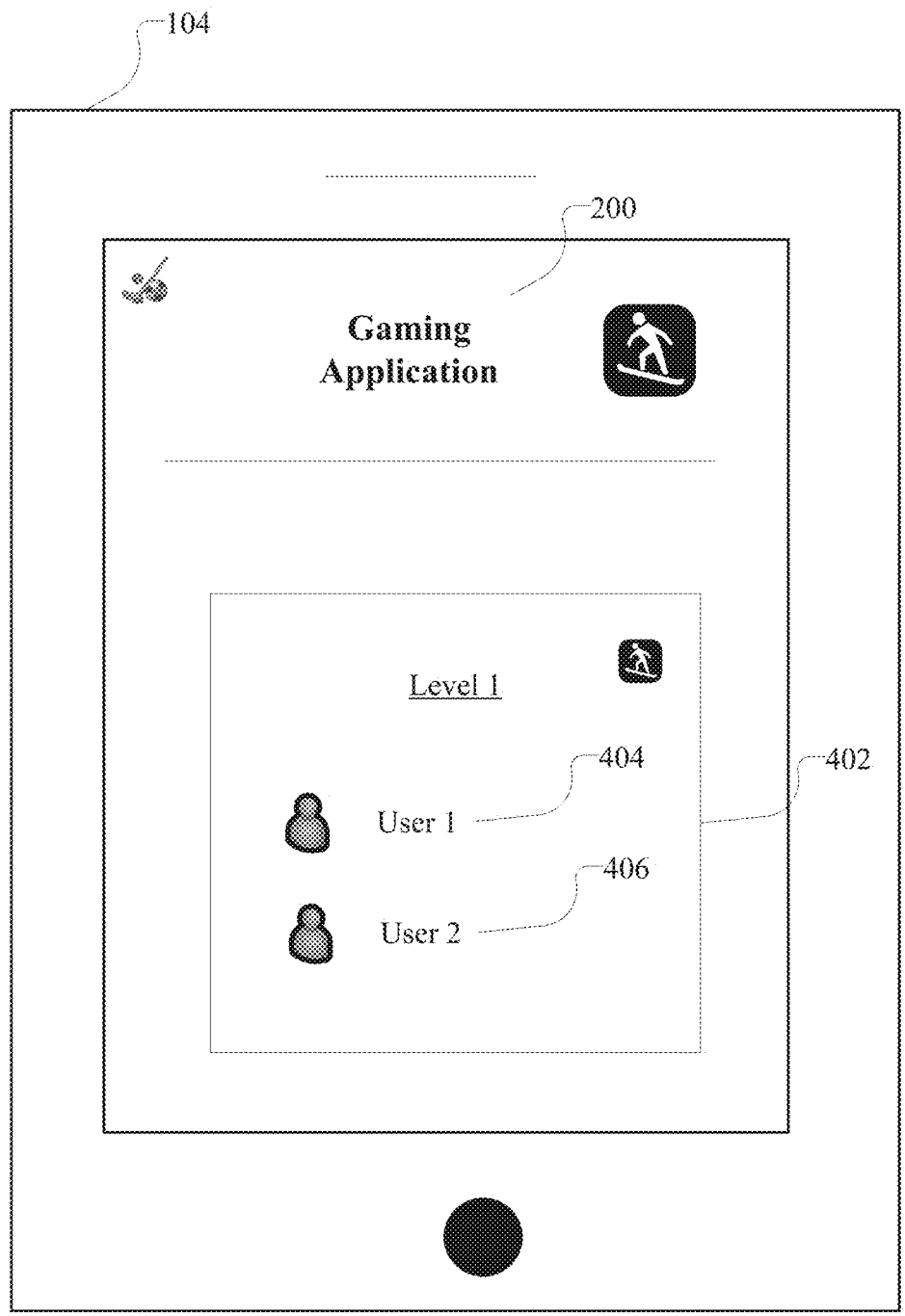
FIG. 4 an example activity initiated in response to an activity notification.

FIG. 4 illustrates an example activity 400 initiated in response to an activity notification. The activity 400 can be a game of the gaming application 200 which was initiated from within the messaging application 300 when the user selected prompt 308 to challenge the user at device 106 to a game of the gaming application 200.

User 404 can be the user at device 104 and user 406 can be the user at device 106. Area 402 can be the game display portion of the gaming application 200 at device 104. Users 404-406 can play each other as they wish, and cancel the game to close the gaming application 200. After closing the gaming application 200, in some cases, the device 104 can allow the user to return to the messaging application 300 and/or initiate a new activity.

Figure 5A:
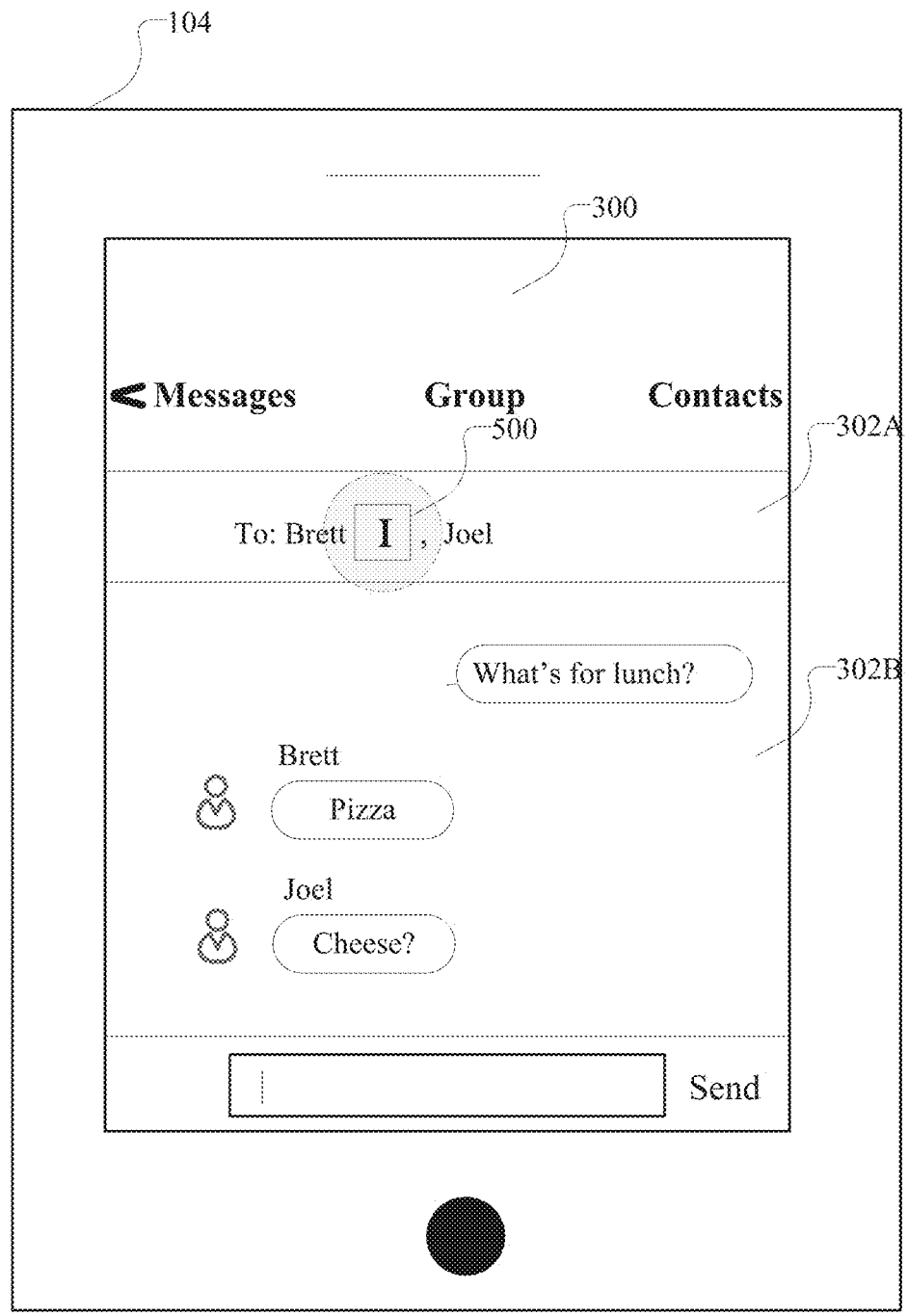
FIGS. 5A-B illustrate an example mechanism for sharing, within a messaging application, Activity Beacon data related to an article.
Figure 5B:
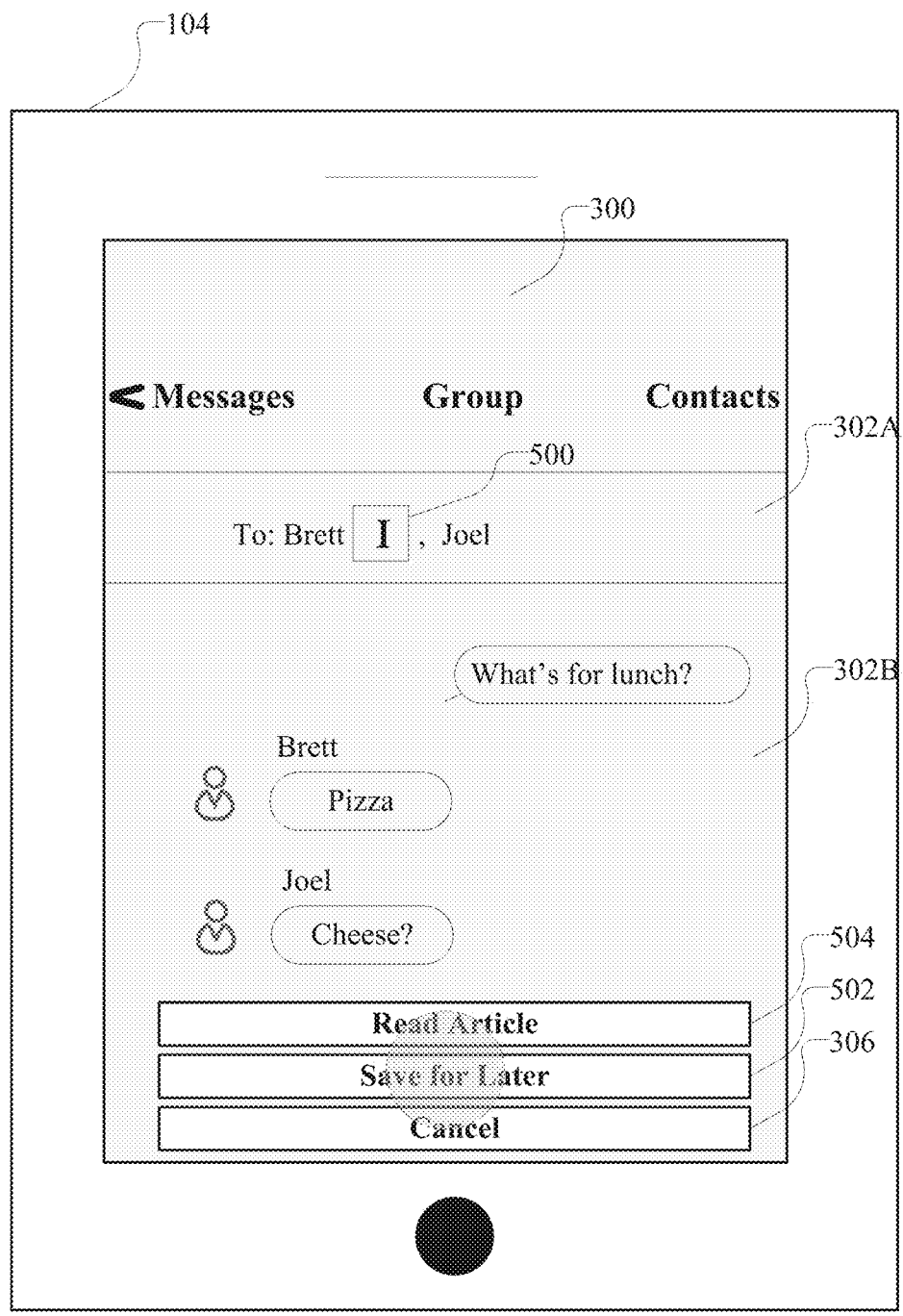

FIGS. 5A-B illustrate an example mechanism for sharing, within a messaging application, Activity Beacon data related to an article. Here, the messaging application 300 can include an activity notification 500 for an article that Brett is reading at his device. The notification 500 can be based on an Activity Beacon setting set by Brett on his device for the reading application he used to launch the article associated with the notification 500.

Referring to FIG. 5B, the user at device 104 can select or click on notification 500 to initiate prompts 306 and 502-504. Prompt 502 can provide the option to save the article for later. Thus, the user at device 104 can select prompt 502 if he or she wants to save the article for reading at a later time. On the other hand, prompt 504 can provide the option to launch the article from device 104. The user at device 104 can thus select prompt 504 to launch the same article being read by Brett. Accordingly, through the Activity Beacon service, users can see and access what other users are reading through notifications received at the messaging application 300 during a communication session.

In some cases, if the specific article being read by Brett is not available at device 104 or otherwise inaccessible, device 104 can provide a prompt to search for the article in other locations, set a reminder to try at a later time, request the article from Brett, etc. In some cases, device 104 and server 108 can coordinate the search for the article. Also, if the device 104 does not have an application for accessing the article (either the same application used by device 106 or a different application capable of rendering the article), device 104 can present a prompt to allow a user to install the application or pick an application from a list of applications. In some cases, server 108 can provide a list of applications capable of rendering the article and/or can indicate which application was used by device 106. Moreover, device 104 can provide other prompts to request or send information or activity data, such as sending comments related to the article, for example.

Figure 6A:
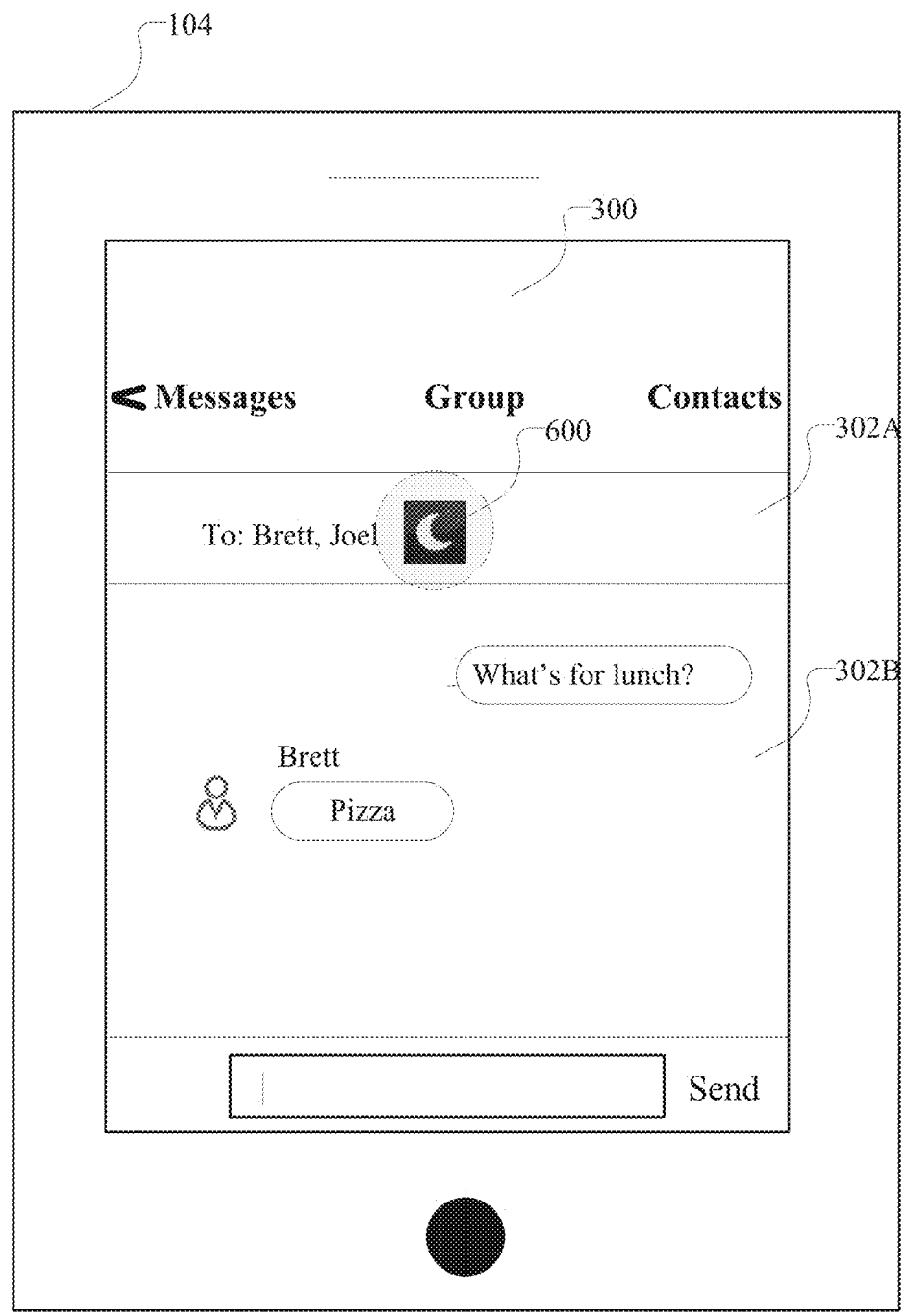
FIGS. 6A-B illustrate an example mechanism for sharing, within a messaging application, Activity Beacon data related to a configured preference.
Figure 6B:
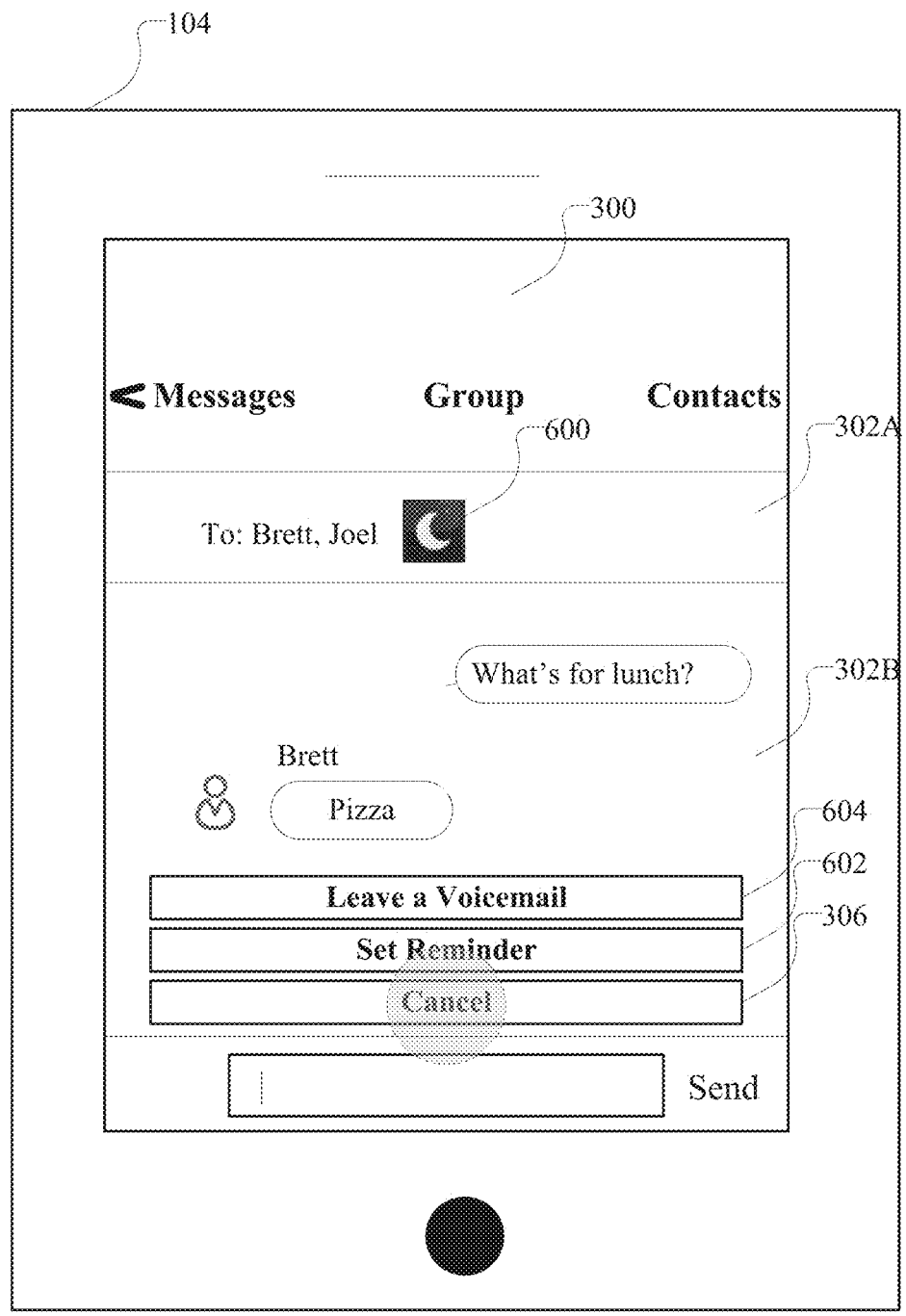

FIGS. 6A-B illustrate an example mechanism for sharing, within a messaging application, Activity Beacon data related to a configured preference. The configured preference can be an activity or interaction preference, for example. Referring to FIG. 6A, the preference notification 600 provides an indication within the messaging application 300 that Joel has indicated that he does not want to be disturbed. Thus, the user at device 104 can ascertain that Joel does not want to be disturbed with messages from the messaging application 300 based on the preference notification 600.

To enable the Activity Beacon for the do not disturb preference, Joel can go to the settings on device 106 for the messaging application 300—and any other communication application—to specify that he does not want to be disturbed. In some cases, the do not disturb setting can alert users, through the preference notification 600, that Joel does not want to be disturbed. In other cases, the do not disturb setting can prevent users from contacting Joel through the messaging application 300, and any other communication application set to do not disturb.

Referring to FIG. 6B, the user at device 104 can select the preference notification 600 to initiate prompts 306 and 602-604. Prompt 602 can provide the user with an option to set a reminder to communicate with Joel or check his availability at a later time. Thus, the user can select prompt 602 to setup the reminder. In some cases, the reminder can be automatically generated or manually configured by the user. Moreover, the reminder can be configured on a calendar or reminders application at the device 104.

Prompt 604 can provide the user at device 104 with an option to leave a voicemail for Joel. Thus, the user can select prompt 604 to leave a voicemail. For example, after the user selects prompt 604, device 104 can allow the user to record a voicemail and save or send it to Joel. In other cases, the user can receive a prompt with an option to send a text message or email to Joel.

Figure 7:
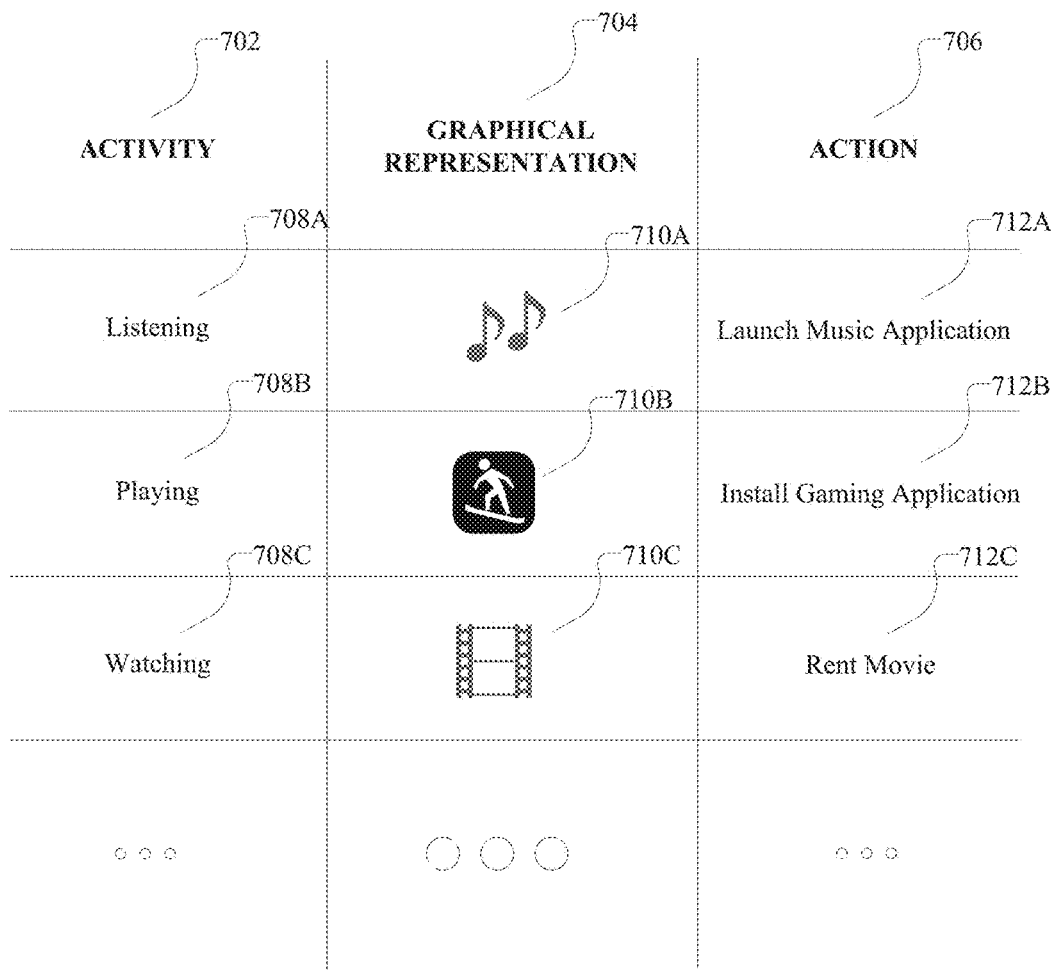
FIG. 7 illustrates an example correlation table for an Activity Beacon service.

FIG. 7 illustrates an example correlation table 700 for an Activity Beacon service. The table 700 can correlate activity 702 with graphical representation 704 and action 706. In other words, the table 700 can identify activities 708A-C and define what graphical representations 710A-C (e.g., icons, logos, images, etc.) are associated with the activities 708A-C, as well as what actions 712A-C are to be performed for the activities 708A-C and/or graphical representations 710A-C.

To illustrate, the activity 708A "Listening" can be correlated with music icons 710A and with the action 712A "Launch Music Application." Thus, when the Activity Beacon detects that a user is listening to music, it can generate a notification using the music icons 710A to alert others that the user is listening to music. When another user selects the music icons 710A, the device can perform the action 712A, namely, it can launch the specific music application.

On the other hand, the activity 708B "playing" can be correlated to game icon 710B and the action 712B "Install Gaming Application." Thus, when the user is playing a game, the game icon 710B is used to notify others, and the action associated with the game icon 710B would be to install the gaming application.

Moreover, the activity 708C "Watching" can be correlated to the movie icon 710C and the action 712C "Rent Movie." Thus, when the user is watching a movie, the movie icon 710C is used to notify others, and the action 712C for renting the movie is correlated to the movie icon 710C.

The Activity Beacon service can use the correlation table 700 to match activities with notifications and actions, for example. Moreover, the correlation table 700 can include more or less correlations than those illustrated in FIG. 7. The examples in FIG. 7 are non-limiting examples provided for clarification and explanation purposes. Other correlations are also contemplated herein.

Having disclosed some basic system components and concepts, the disclosure now turns to the example method embodiments shown in FIGS. 8 and 9. For the sake of clarity, the method is described in terms of device 104, device 106, and server 108, as shown in FIG. 1, configured to practice the methods. The steps outlined herein are exemplary and can be implemented in any combination thereof, including combinations that exclude, add, or modify certain steps.

FIG. 8 illustrates an example method embodiment for sharing activity data between device 104 and device 106. Device 104 first receives a signal to enable a service for sharing activity data between the device 104 and device 106 during a communication session between the device 104 and device 106 (800). The communication session between device 104 and device 106 can be maintained through a first application. The first application can be, for example, an instant messaging application, an email application, a text messaging application, a video conference application, an asynchronous messaging application, an audio communication application, iMessage®, or any other communication application. The signal to enable the service can be a setting for an Activity Beacon service. The setting can be configured from a specific application or a system device settings or preferences panel, for example.

Device 104 then tracks an activity associated with the device 104 or a second software application at the device 104 to yield activity data (802). The activity can be a usage or status of the device 104 or the second software application. For example, the activity can be usage of specific features of the device 104 or a launch of the second software application. The activity data can include time-based metadata associated with the activity, device data, user preferences, interactions, and/or a current user status. The user preferences can be, for example, do not disturb preferences, try again later preferences, user is busy or driving, etc. The current user status can include, for example, an indication that a user associated with the device 104 is currently performing a user activity or an indication that the user is currently in a no-connectivity zone.

Moreover, the second software application can be different or separate from the first software application (i.e., the communication application). For example, the first software application can be a messaging application and the second software application can be a specific software game. In some cases, the second software application can refer to a system preference or feature. For example, the second software application can refer to a do not disturb feature configured for a specific type of communication at device 104.

Next, device 104 transmits an activity beacon to the device 106 based on the activity data (804). The activity beacon can include the activity data and a second signal for triggering a presentation of a representation of the activity at the device 106 within the first application. The activity data can be included in a payload of the activity beacon. Moreover, the representation of the activity can be an icon, a logo, an image, a video, a text, a graphical element, a symbol, a character, or any other representation. Further, the representation of the activity can be a notification of the activity. The notification can provide an indication of the activity executed at device 104 using the representation of the activity.

In some cases, the activity beacon can broadcast the activity at the device 104 to the first application at the device 106. The device 106 can then receive the activity from the activity beacon during a communication session through the first software application, and subsequently present a notification of the activity (e.g., representation of the activity) within the first software application. The notification can be user selectable, and can be configured to trigger an action or prompt associated with the activity, such as launch or install an application associated with the activity or prompt the user to launch or install the application. For example, when a user at device 106 selects the notification, the device 106 can generate one or more prompts for the user requesting further action.

The prompts can ask the user if he or she wants to perform the activity (i.e., launch the second software application) from device 106, challenge the user at device 104, save the activity for later, install the second software application, add the second software application to a wishlist, etc. When the user selects a prompt, the specific action defined by the prompt can be initiated. For example, if the prompt asks the user to launch the second software application, when the user selects the prompt, the device 106 can then launch the second software application.

In some cases, the activity beacon can also be used by advertisers and groups of users. For example, advertisers can bid on user's placement of their application icons or tiles in exchange for some value, such as application currency for example. Advertising networks can also create audience cubes of 'Thought Leaders', 'Application Enthusiasts', or 'Experts', etc., which advertisers can target. Moreover, users who are a part of these cube memberships can receive the benefits of broadcasting the advertiser's application as part of their activity beacon.

Additionally, there can be group activity beacon use cases. Here, groups of users can broadcast their activity in a group messaging session. This can be useful to certain applications dealing with groups, events, or teams, such as sports-related applications or team applications.

FIG. 9 illustrates a second example method embodiment for sharing activity data between device 104 and device 106 through server 108. Server 108 maintains a communication session between device 104 and device 106 (900). Device 104 and device 106 can use a communication application, such as a text messaging or instant messaging application, to conduct or facilitate the communication session. The communication session can be any communication session, including an audio, video, and/or text session.

Server 108 then receives, from device 106, an activity beacon including activity data defining an activity performed at device 106 (902). The activity can be, for example, a use of an application at device 106, a use of a feature at device 106, a current status of a user at device 106 or the device 106, a current context or setting at device 107, etc. For example, the activity can be traveling out of a signal range such that the device 106 does not have a communication signal, or a busy activity such that the user at device 106 does not want to be disturbed.

During the communication session between the device 104 and device 106 and based on the activity beacon received from device 106, server 108 then transmits, to device 104, a signal instructing the device 104 to present a notification of a representation of the activity data within a communication application on device 104 used by the device 104 for the communication session (904). For example, server 108 can transmit an instruction to device 104 to present, at the communication application (e.g., text or instant messaging application), an icon representing an application being used by device 106 as determined based on the activity data and the activity beacon.

Moreover, the notification or representation can be user-selectable. Thus, when the user at device 104 selects the notification or representation, the server 108 can generate a prompt or signal for further notifications, representations, or content. For example, if the user at device 104 selects an icon representing gaming application 200, presented at device 104 to indicate that device 106 is running gaming application 200, the server 108 can then generate a signal, instruction, or prompt to ask the user at device 104 if he or she wishes to install gaming application 200, run gaming application 200, add gaming application 200 to a wishlist, challenge the user at device 106 to a game of gaming application 200, etc.

Server 108 can continue to collect Activity Beacon settings and/or data from device 106 and/or device 104 to share activity data, including notifications or representations of activities and applications used, between device 104 and device 106. Server 108 can also track or collect statistics to further supplement the activity data shared with a device. For example, server 108 can receive Activity Beacon data from device 106 indicating that device 106 is running gaming application 200, and subsequently collect a current score earned by the user at device 106 on gaming application 200 to send the score to device 104 in addition to the activity data relating to gaming application 200.

Furthermore, server 108 can also filter activity data, sort activity data, and condition activity data prior to sharing such activity data with device 104. For example, server 108 can collect statistics and/or preferences at device 104 and, based on the statistics or preferences, determine that the user at device 104 is not interested in activity data relating to gaming application 200. Thus, when device 106 transmits Activity Beacon data relating to gaming application 200, server 108 can filter such data to prevent presenting it at device 104—or instructing device 104 to present it—based on a determination that the user at device 104 is not interested in receiving activity data about gaming application 200.

Example Devices

FIG. 10A, and FIG. 10B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

I claim:

1. A computer-implemented method comprising:
maintaining a messaging session between a first device and a second device, wherein the messaging session is maintained using a messaging application on the first device and the second device, wherein the messaging application comprises a communication interface between the first device and the second device;
receiving, at the first device, an activity beacon from the second device, the activity beacon comprising activity data indicating an activity within a second application on the second device, wherein the activity is associated with user interaction with the second application on the second device, and wherein the second application is different from the messaging application, wherein the activity data comprises a current user status and a do not disturb preference, and wherein the current user status comprises at least one of an indication that a user associated with the second device is currently performing a user activity or an indication that the user is currently in a no-connectivity zone;
in response to receiving the activity beacon, triggering a presentation, within the messaging application on the first device, of a representation of the activity; and
in response to detecting selection of the representation of the activity;
    if the second application is not installed on the first device, displaying a selectable installation prompt to install the second application, and
    displaying, in the messaging application at the first device, selectable user prompt to launch the second application on the first device based on the activity data.

2. The method of claim 1, wherein the messaging application comprises a text messaging application and the activity at the second device comprises a real-time activity.

3. The method of claim 1, wherein the activity data further comprises at least one of time-based metadata associated with the activity at the second device, device data, or user preferences.

4. The method of claim 1, wherein the activity data is included in a payload of the activity beacon, and wherein the activity beacon is broadcasted from the second device to the first application at the first device.

5. The method of claim 1, wherein the activity at the second device comprises a use of the second application, and wherein the representation of the activity comprises a graphical element representing the second application.

6. The method of claim 5, wherein the graphical element comprises an indication of at least one of a status or a usage of the second application at the second device.

7. The method of claim 1, wherein the selectable user prompt comprises at least one selectable control for saving or accessing content associated with the second application.

8. The method of claim 1, wherein at least one of the first device and the second device comprises a mobile device, and wherein the activity at the second device comprises a real-time action performed with the second application at the second device.

9. A system comprising:
one or more processors; and
one or more non-transitory computer-readable storage media having stored therein instructions which, when executed by the one or more processors, cause the one or more processors to:
maintain a messaging session between a first device and a second device, wherein the messaging session is maintained using a messaging application on the first device and the second device, wherein the messaging application comprises a communication interface between the first device and the second device;
receive, at the first device, an activity beacon from the second device, the activity beacon comprising activity data indicating an activity within a second application on the second device, wherein the activity is associated with user interaction with the second application on the second device, and wherein the second application is different from the messaging application, wherein the activity data comprises a current user status and a do not disturb preference, and wherein the current user status comprises at least one of an indication that a user associated with the second device is currently performing a user activity or an indication that the user is currently in a no-connectivity zone;
in response to receiving the activity beacon, trigger a presentation, within the messaging application on the first device, of a representation of the activity; and in response to detecting selection of the representation of the activity;
if the second application is not installed on the first device, displaying a selectable installation prompt to install the second application, and
display, in the messaging application at the first device, a selectable user prompt to launch the second application on the first device based on the activity data.

10. The system of claim 9, wherein the activity at the second device comprises a real-time activity.

11. The system of claim 9, wherein the activity data further comprises at least one of time-based metadata associated with the activity at the second device, device data, or user preferences.

12. At least one non-transitory computer-readable storage medium having stored therein instructions which, when executed by one or more processors, cause the one or more processors to:
maintain a messaging session between a first device and a second device, wherein the messaging session is maintained using a messaging application on the first device and the second device, wherein the messaging application comprises a communication interface between the first device and the second device;
receive, at the first device, an activity beacon from the second device, the activity beacon comprising activity data indicating an activity within a second application on the second device, wherein the activity is associated with user interaction with the second application on the second device, and wherein the second application is different from the messaging application, wherein the activity data comprises a current user status and a do not disturb preference, and wherein the current user status comprises at least one of an indication that a user associated with the second device is currently performing a user activity or an indication that the user is currently in a no-connectivity zone;
in response to receiving the activity beacon, trigger a presentation, within the messaging application on the first device, of a representation of the activity; and
in response to detecting selection of the representation of the activity;
if the second application is not installed on the first device, displaying a selectable installation prompt to install the second application, and
display, in the messaging application at the first device, a selectable user prompt to launch the second application on the first device based on the activity data.

13. The non-transitory computer-readable storage medium of claim 12, wherein the activity data further comprises at least one of time-based metadata associated with the activity at the second device, device data, or user preferences.

14. The non-transitory computer-readable storage medium of claim 12, wherein the activity at the second device comprises a real-time activity.

15. The non-transitory computer-readable storage medium of claim 12, wherein the activity at the second device comprises a use of the second application, and wherein the representation of the activity comprises a graphical element representing the second application.

16. The method of claim 1, wherein the activity beacon is a first activity beacon, the method further comprising:
receiving a second activity beacon from the second device, the second activity beacon comprising additional activity data, wherein the additional activity data is associated with a third application, wherein the messaging application is different from the third application; and
in response to receiving the second activity beacon, displaying, in the first application at the first device, a plurality of selectable user prompts to initiate activity in the third application on the first device based on additional activity data.

17. The system of claim 9, wherein the activity beacon is a first activity beacon, wherein the instructions further cause the one or more processors to:
receive a second activity beacon from the second device, the second activity beacon comprising additional activity data, wherein the additional activity data is associated with a third application, wherein the messaging application is different from the third application; and
in response to receiving the second activity beacon, display, in the first application at the first device, a plurality of selectable user prompts to initiate activity in the third application on the first device based on additional activity data.

18. The non-transitory computer-readable storage medium of claim 12, wherein the activity beacon is a first activity beacon, wherein the instructions further cause the one or more processors to:
receive a second activity beacon from the second device, the second activity beacon comprising additional activity data, wherein the additional activity data is associated with a third application, wherein the messaging application is different from the third application; and in response to receiving the second activity beacon, display, in the first application at the first device, a plurality of selectable user prompts to initiate activity in the third application on the first device based on additional activity data.

\* \* \* \* \*